July 10, 1934.  W. STELZER  1,966,148
WHEEL
Filed April 15, 1931    2 Sheets-Sheet 1

INVENTOR.
WILLIAM STELZER
BY H. O. Clayton
ATTORNEY.

July 10, 1934.  W. STELZER  1,966,148
WHEEL
Filed April 15, 1931   2 Sheets-Sheet 2

INVENTOR.
WILLIAM STELZER
BY
ATTORNEY.

UNITED STATES PATENT OFFICE 1,966,148

WHEEL

William Stelzer, South Bend, Ind., assignor to Bendix Brake Company, South Bend, Ind., a corporation of Illinois Application April 15, 1931, Serial No. 530,281

7 Claims. (Cl. 301—18)

This invention relates to wheels and more particularly to wheels for automotive vehicles.

An object of the invention is to provide a wheel structure of few parts and therefore economical of manufacture; light of weight, yet sufficiently strong to withstand both load and side thrust stresses, and readily demountable, either at the rim or at the hub to facilitate its use on an automotive vehicle.

It is a particular object of the invention to provide a very practical structure for rendering the rim demountable and in one embodiment of the invention, there is provided means, secured to the rim and wheel felly structure for imparting relative movement therebetween to effect a wedging engagement between the rim and the parts of the felly structure, the latter parts moving bodily in the plane of the wheel.

Further objects of the invention, including a novel method of fabricating the afore-mentioned felly structure and other desirable details of construction will become apparent from the following description of preferred embodiments of my invention disclosed in the accompanying drawings in which.

Figure 3:
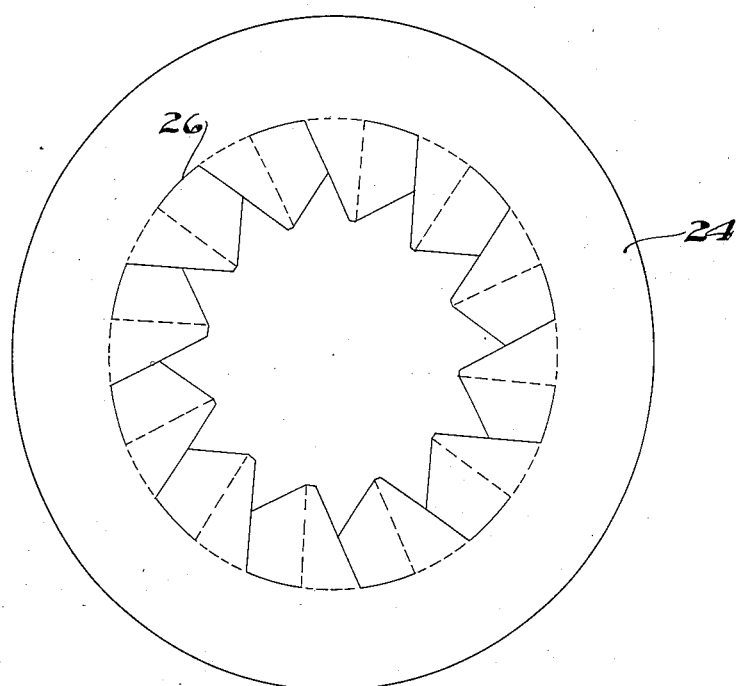
Figure 4:
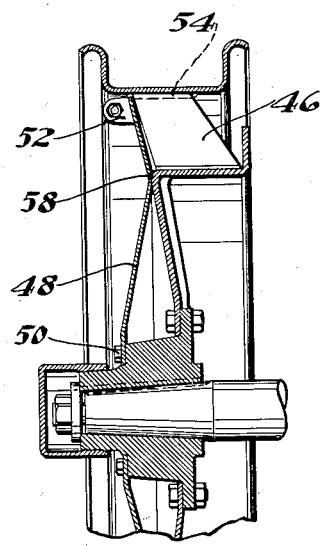

Figure 3 discloses the slotted blank from which the novel rim supporting or felly portion of the wheel is fabricated;

Figure 4 discloses a modified form of wheel structure.

Figure 1:
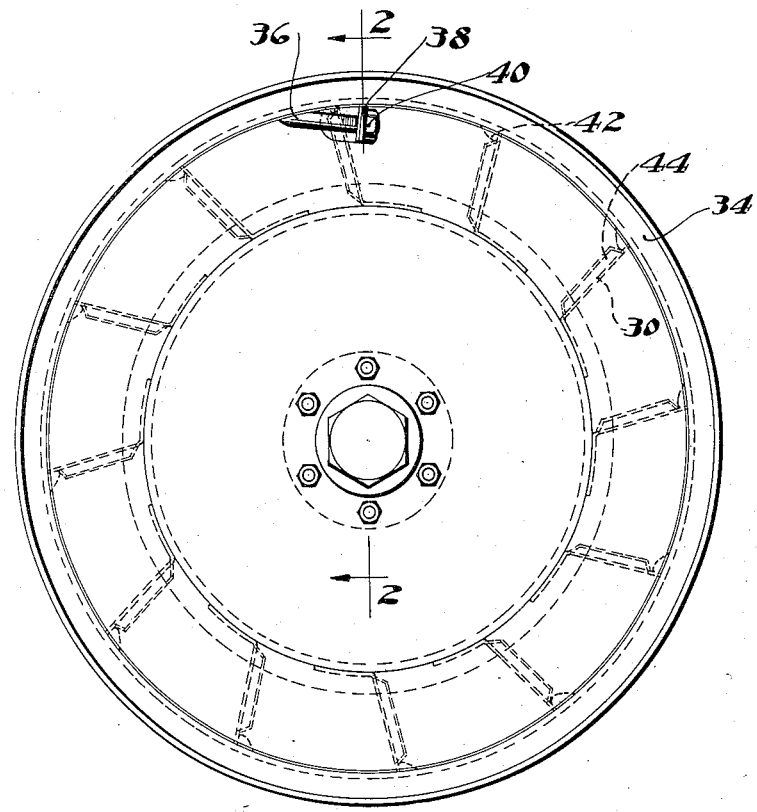
Figure 1 is a side elevation of my novel wheel structure.
Figure 2:
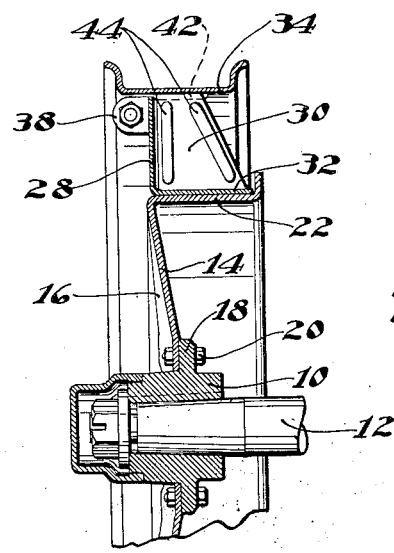
Figure 2 is a vertical section through the wheel taken on line 2—2 of Figure 1.

In that exemplification of my invention disclosed in Figures 1 and 2, there is provided a hub member 10 rotatably mounted or fixedly secured to the axle member 12. A brake drum member 14, preferably reinforced by corrugations 16, is secured at its inner periphery to a flange 18 on the hub member, by bolts or equivalent securing means 20. The braking flange 22 of the brake drum, which is preferably positioned to be substantially bisected by the load plane of the wheel, constitutes a support for my novel rim supporting or felly structure.

This felly structure is preferably fabricated from a disk, the central portion of which is cut out to provide an annular ring member 24 disclosed in detail in Figure 3. The ring member is then preferably slotted in the manner disclosed in Figure 3. The material is then folded along a prolongation of the slots 26 to provide an annular, radially extending ring portion 28, (Figure 2) extending at right angles to the supporting tongues 30, which have been bent upwardly as disclosed in dotted lines in Figure 1 to provide spaced substantially radially extending rim support members. The laterally extending portions 32, of the felly structure, are now preferably secured, as by welding, to the outer surface of the braking flange, thereby completing the wheel structure.

A demountable rim 34, which may be provided with one or more circumferentially extending securing members 36, is adapted to be mounted on the outer edges of the members 28 and 30. The annular member 28 is provided with a struck-out lug portion 38, having openings therein adapted to receive the circumferentially extending members 36.

In the operation of assembling the demountable rim on the felly, the rim is moved laterally into position over the felly portion and then circumferentially relative thereto to register the projections 36 within the lugs 38. A nut 40 is then tightened up to impart relative movement between the rim and felly, the radially extending flange portions 30 of the felly moving into engagement with abutments 42 on the inner surface of the rim as the relative movement continues and the flanges 30 approach a radially extending position. This operation effects a secure attachment of the rim to the felly. The flanges 30 may be embossed or corrugated at 44 to reinforce the same.

There is disclosed in Figure 4, a modified form of wheel in which the braking flange is provided with spaced radially extending flange members 46 integrally secured to the outer surface of the braking flange. A disk body member 48, preferably integrally secured to the junction of the braking flange and head of the brake drum and also to the hub of the wheel at 50, is provided with lugs 52, similar to the lugs 38 of Figure 1. The rim of this modification is also provided with securing means similar to that of the modification of Figure 1 and relative movement of the rim with respect to the wheel body effects the afore-mentioned engagement between the flanges 46 and lugs 54 on the inner rim surface to thereby effect a rigid engagement between the rim and wheel body. The disk 48 serves to cover up the brake drum and flanges and improve the appearance of the wheel. The rim, felly, and other wheel parts are preferably arranged so that the load plane bisects the rim and passes through the junction at 58 between the cover disk and brake drum.

While there have been described and disclosed two embodiments of the invention, it is to be understood that these are given purely by way of example and as some of the principles of the invention may be incorporated in other specific structures, I do not intend to be limited to those described, except as such limitations are clearly imposed by the appended claims.

I claim:

1. A wheel structure comprising felly and rim members, means for imparting relative circumferential movement between said members and wedging means adapted to produce on movement gradually increasing radial pressures with uniform force applied to said circumferential movement imparting means securing said members together, said latter means being bodily movable in the plane of the wheel during the relative movement of the rim and felly.

2. A wheel structure comprising a felly member provided with radially extending flanges, a rim member, and means adapted to impart relative movement between said rim and felly member effecting a toggle like wedging engagement between said flange members and said rim to secure the latter in position.

3. A wheel structure comprising a felly member provided with a base or support member and radially extending flange members, a rim member, and means adapted to impart relative rotative movement between said rim and felly member effecting a wedging engagement between said flange members and said rim to secure the latter to the former, said flanges being angularly movable bodily about their junction with said base member during said wedging operation.

4. A wheel structure comprising a felly member provided with radially extending flanges and a circumferentially extending flange having laterally extending lug members secured thereto, a rim member and means cooperating with said rim and lug members, said means adapted to impart relative movement between said rim and felly member to effect a toggle like wedging engagement between said flange members and said rim to secure the latter to the felly.

5. A wheel comprising a central drum member, a rim member concentric therewith and spaced therefrom, spokes of greater length than the spacing between said drum member and rim, and means for pivoting said spokes along elements of said drum to securely fasten said rim to said drum and place said spokes under compression said means including a substantially tangentially arranged tension member adapted to rotate said rim relative to said drum.

6. A wheel comprising a hub and drum member, a concentric rim member spaced from said drum member, spokes of greater length than the space between said drum and rim secured to said drum member and adapted to pivot each in the same direction upon the drum member along elements thereof, and means for simultaneously urging the spokes toward radial position to securely fasten said rim to said drum.

7. A wheel comprising a central drum member, a rim member concentric therewith and spaced therefrom, spokes of greater length than the spacing between said drum member and rim, and means for pivoting each of said spokes in the same direction along elements of said drum to securely fasten said rim to said drum and place said spokes under compression.

WILLIAM STELZER.